April 2, 1957 R. K-F SCAL 2,787,735

SUPPORT AND HOUSING FOR ELECTRONIC CIRCUITS

Filed May 25, 1951 3 Sheets-Sheet 1

INVENTOR.
ROBERT K-F SCAL
BY G. D. O'Brien
Q. Baxter Warner
ATTORNEYS

SUPPORT AND HOUSING FOR ELECTRONIC CIRCUITS

Filed May 25, 1951 3 Sheets-Sheet 2

INVENTOR.
ROBERT K-F SCAL
BY [signature]
[signature]
ATTORNEYS

April 2, 1957 R. K-F SCAL 2,787,735

SUPPORT AND HOUSING FOR ELECTRONIC CIRCUITS

Filed May 25, 1951 3 Sheets-Sheet 3

INVENTOR.
ROBERT K-F SCAL
BY G. W. O'Brien
O. Baxter Warner
ATTORNEYS

United States Patent Office 2,787,735

Patented Apr. 2, 1957

2,787,735

SUPPORT AND HOUSING FOR ELECTRONIC CIRCUITS

Robert K-F Scal, Englewood, N. J., assignor to the United States of America as represented by the Secretary of the Navy Application May 25, 1951, Serial No. 228,344

2 Claims. (Cl. 317—101)

(Granted under Title 35, U. S. Code (1952), sec. 266)

This device relates to the structural arrangement of a subminiature electron tube circuit enclosure, and more particularly to the provision of support means and housing means for small parts such as subminiature electronic components and their connecting circuits.

With the increasing use of electronic circuits in the communication and control fields, and the growing complexity and number of such circuits in performing high speed and multicapacity functions, the space occupied by the electronic devices becomes important and the need for miniaturization arises. Radar circuits for use in small moving craft such as aircraft, are particular examples of applications in which the increase in size and complexity of electronic circuits has necessitated new techniques in miniaturization. Some miniaturization has taken place, but with continued improvement in these systems to achieve greater accuracy and more complete and newer activities, the need for more extensive reductions in weight and volume to keep pace with the ever increasing development of improved systems has arisen. Attempted reductions in weight and volume have followed in general two main courses, the reduction in the size of the elements themselves, and secondly the utilization of these miniature and subminiature components in improved chassis and housings allowing these subminiature units to be substituted for the larger devices while providing satisfactory performance. Such devices are required to occupy only a fraction of the weight and volume of the larger units, but must still be able to handle the same amount of power and with equivalent or improved performance. This basic requirement of power transmission alone indicates that these devices must dissipate the same amount of heat through smaller volume dimensions, and accordingly operate at much higher temperatures. Other important problems which arise and are prevalent in all electronic circuits operating at relatively high frequencies, but more particularly noticeable and important in miniature circuits are the high frequency effects. The dimensions of the components themselves, the connecting wires, and the relative placement of the parts, whose effect may be negligible at low frequencies become increasingly objectionable as the frequency is raised, allowing stray capacity and inductance to act as phase shifters and shunts, and feedback to be generated producing oscillation and noise. In addition the reduction in the size of the elements, while requiring these elements to perform the same function as the larger components, reduces their physical strength, rendering them less able to withstand the shocks and forces to which they may be subjected due to the high acceleration rates of the modern craft on which they are to be used.

The present device in order to correct for some of these above-mentioned difficulties provides a structurally rigid housing and supporting means for a subminiature electrical circuit which is small, compact, and extremely light in weight without loss of rigid support for the subminiature components thereby permitting electrical high frequency grounding and shielding for eliminating feedback in the circuit, and allowing high thermal conduction and radiation for cooling the operating circuit components. It includes a number of interlocking housing members permitting ease and rapidity of assembly while allowing ready access to the subminiature circuit for repair or replacement of parts or units.

The particular type of miniature circuit with which this preferred form of housing construction is illustrated, includes a linear array of interconnected electron tube stages together comprising an intermediate frequency amplifier having a center frequency between 25 and 125 megacycles per second. A detailed description of the preferred circuitry involved may be found in the Bureau of Standards Publication entitled "Terminal Report Model V Miniature Intermediate-Frequency Amplifier" by Robert K-F Scal.

It is accordingly an object of this invention to provide a housing for a multistage subminiature electron tube circuit affording to the tube circuit improved mechanical, thermal, and electrical characteristics.

It is a further object of this invention to provide a housing for completely enclosing a linear array of interconnected subminiature electron tube stages, occupying but a fraction of the volume of an equivalent functioning standard electron tube circuit and housing and operable to dissipate great amounts of heat.

It is a further object of this invention to provide a housing and terminal socket member for completely enclosing and supporting a linear array of assembled subminiature electron tube stages, for providing great mechanical rigidity thereto.

A further object of this invention is to provide an airtight housing and terminal connecting means for an electrical circuit including a linear array of subminiature electron tubes.

A further object of this invention is to provide support means for subminiature electron tube circuit to afford the device electrical, mechanical, and thermal stability.

A further object of this invention is to provide means whereby a plurality of assembled electronic components may be handled as a unit and provided with quick disconnect electrical connections and may be enclosed within a suitable housing.

A further object of this invention is to provide a housing for a subminiature electron tube circuit having interlocking enclosing members to minimize high frequency extraneous effects.

Other objects and advantages will be readily apparent to those skilled in this art during the course of the following description, taken in connection with the accompanying drawings forming a part of this specification in which.

Figures 1, 2:
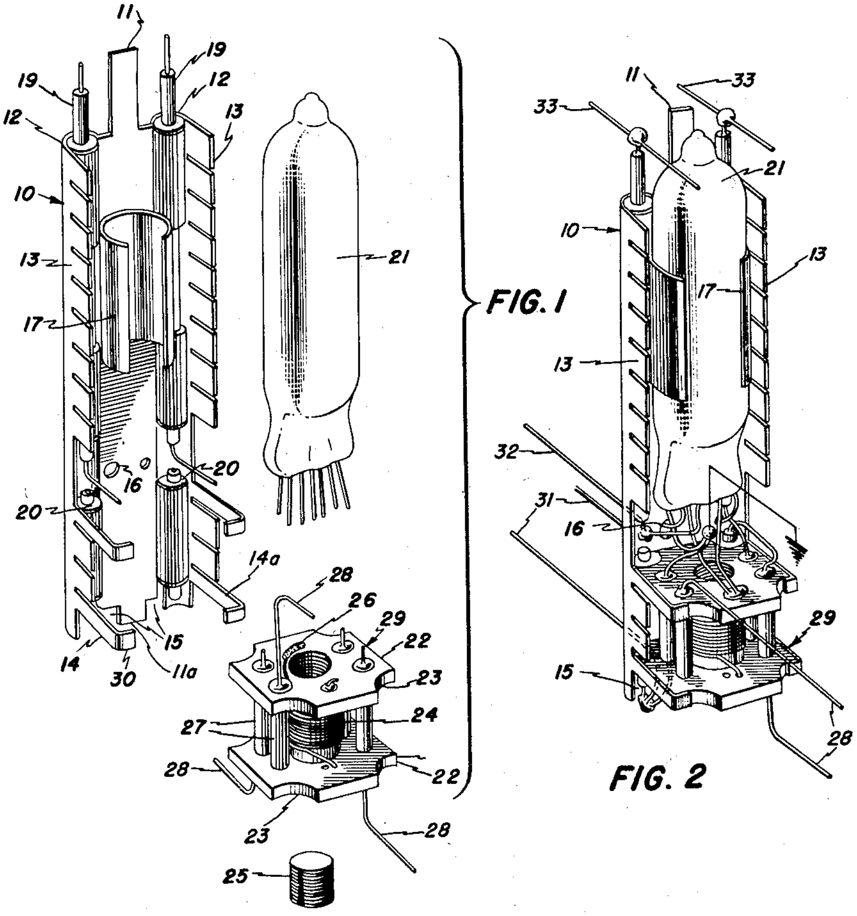
Fig. 1 and Fig. 2 are an exploded isometric view and an isometric view respectively, of the physical arrangement of subminiature elements in a single electron tube stage.

Referring to the drawings in detail: Fig. 1 is an exploded view of a subminiature electron tube stage, comprising one unit of a multistage circuit of the type to be supported, shielded, housed, and cooled by means of the present invention, and the numeral 10 designates generally an upright stage chassis comprising in its preferred form an elongate member of U-shaped cross section of a relatively thin sheet material, such as metal, having high electrical and thermal conductive properties. As shown these individual stage chassis may be formed with a flat intermediate portion disposed between parallel slotted arms 13, 13 which are spaced to receive an electronic tube and other components as illustrated. Integral tabs 11 and **11*a* extend upwardly and downwardly from the top and bottom ends of each stage chassis. The slotted arms where they join the intermediate portion may have grooves 12, adapted to nest tubular electrical components such as condensers or resistors 19 and 20. The stage chassis 10 are also provided with spaced elongate arms 14 and 14*a* which have inturned ends 30 to engage and retain an inductor form 29 comprising a nonconducting tubular member 24 having its ends embedded in upper and lower spaced plates 22. Miniature inductor or transformer coils may be wound around member 24, within which, a threaded core shown generally as 25 may be positioned for tuning as is well known to the art. The upper and lower plates 22 of the inductor form are apertured to receive tubular miniature circuit elements 27 having connecting leads 28 extending from the ends thereof. Members 22 are preferably notched at 23 as shown and if desired the edges of the plates where notched may be silvered for later soldering connection of the tips 30 thereto. A slit cylinder 17 is provided as a tube clip for fastening electron tube 21** to the stage chassis.

Elements 19, 20 and 27 above referred to as miniature circuit elements may of course be resistors, capacitors, inductors, or any combination thereof as may be necessary in the circuit. Miniature resistors of this type may be formed of cracked carbon deposited on a ceramic rod, or thin resistive wire spiraled around this rod. Capacitors of miniature cylindrical form, are made of hollow tubular material of given dielectric constant having a silver coating on the inner and outer periphery of the tube. Obviously, variations of these arrangements will provide filter networks, and as these devices and their modifications are known to the art, further reference to their detailed construction is not believed necessary.

The construction of an individual stage of the type shown in Fig. 2 is accomplished in two steps. First, tubular elements 19 and 20 are secured in grooves 12. Next, the tube clip 17 is fastened in place as shown, and the tube inserted. In the second step the inductor form 29 is assembled by winding the coil or coils around form 29 and inserting tuning core 25. Elements 27 are inserted and soldered within the proper apertures in upper and lower plates 22, and the completed unit 29 is mounted within the space formed by chassis plate arms 14 and **14*a*. The tips 30 may then be soldered to the silvered notched portions 23** to rigidly fasten this unit to the stage chassis.

At this point it may be noted that this subminiature stage is completely made up of what may be called "self-jigging" components, that is all electrical elements are mechanically fastened in place to either a larger structural member and the larger member fastened to the stage chassis, or fastened directly to the stage chassis before electrical interconnection of the elements is made. This "self-jigging" arrangement presents many advantages due to the difficulty of electrically connecting small electrical elements of this type by ordinary methods, and the danger of breakage of these subminiature elements when connected by conventional procedures.

The circuit elements are then connected by a soldering operation, and due to the closeness of the various elements when fastened to the stage plate, their individual leads in most cases suffice for both support means and provide connecting electrical lines. Further electrical connections required between the elements other than a direct connection by means of the element's own lead-in wires may readily be accomplished by the use of known printed circuit techniques. For example, the holding plates 22 of inductor unit 29 may, if desired, be coated with electrically conducting material as shown at point 26 to provide terminal points for connecting the elements carried by member 29 with other parts of the circuit.

Fig. 2 is an isometric view of the completed construction of the single stage circuit of Fig. 1, showing all of the electrical and electron tube elements fastened to the individual stage chassis and electrically wired. The chassis with its spaced arms substantially encloses three sides of the subminiature electron tube stage components, and shields these interconnected components from electrical fields generated to the rear. The upward and downward extensions 11 and **11*a* of the chassis act as shields above the electron tube 21 and below the coil holding unit 29. A further chassis opening numbered 16 in Fig. 1, may be seen from Fig. 2 to permit coupling lines to pass through the semienclosed stage and allow electrical connection to a succeeding stage. The spaces 15 on each side of the downward extension 11*a* also may be used for interstage electrical connection. Thus the chassis 10, except for small openings provided for the stage interconnection, assures adequate compartmentation of the stage thereby providing electrical shielding and, in high frequency applications, prevents any "waveguide" propagation within the system. In addition to its electrical functions, the shield acts as a thermally conductive body to aid in dissipating the heat generated within the stage. The tube clip 17 surrounds the hottest portion of the electron tube 21 and hence provides maximum heat conduction at this point. The fingers 13 on the upper and lower part of the side arms of chassis 10**, as may be later seen, make good electrical and thermal contact with enclosing metal members and therefore additionally provide better heat dissipation and grounded connection for the individual stages.

Figure 3:
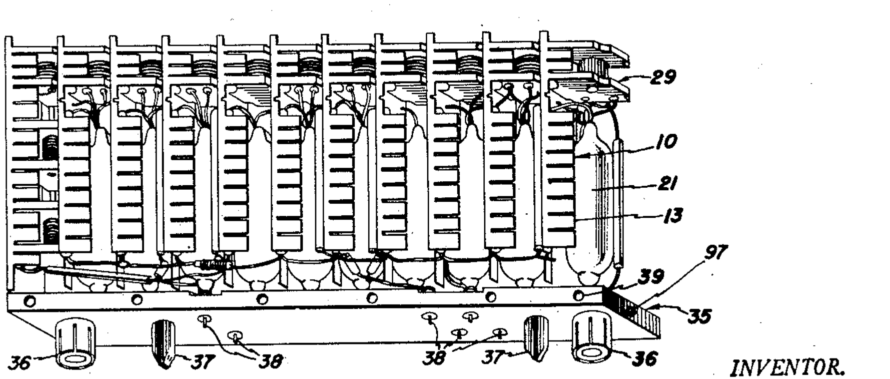
Fig. 3 is an isometric view of a multistage electron tube circuit comprising a linear array of a plurality of individual subminiature stages of Fig. 2 connected on a terminal plate.

Fig. 3 shows a series of cascaded stages of the type shown by Fig. 2 electrically interconnected to form a miniaturized multistage circuit. It is seen that this arrangement of the individual stages permits the stage chassis 10 of the first stage to complete the shielding surrounding the second stage. No interstage mechanical connection is needed as the electrical interstage coupling of the various units provides sufficient rigidity for fastening the individual stage circuits together. Common electrical connections to the multistage circuit such as plate power supply voltage, ground voltage, and the control grid bias supplies having common electrical terminals may be brought out through a flat elongate terminal plate shown generally as 35 which plate serves as an electrical terminal board, and provides a structurally rigid member for fastening the later enclosing containers. The terminal plate 35 is provided with a coaxial connector 36 at each end which is embedded in and passes through the thickness of the plate to allow electrical conduction from the upper side of the connectors on one side of the plate through the coaxial connector to the opposite side of the plate. Two hollow exhaust tubes 37 extend through holes provided in the terminal plate 35 and are soldered thereto. These tubes may serve as guide pins to provide alignment upon insertion of the multistage subminiature electron tube assembly into further socket connections, and in the event that the multistage miniature circuit is to be hermetically sealed within a casing, they provide means for exhausting air or inserting an inert gas or liquid filler.

Insulated terminals 38, which in the preferred illustrative embodiment are glass Kovar plug-in terminals, extend entirely through the terminal plate and provide an insulated connection therethrough. The opposite ends of these terminals may be connected to appropriate parts of the assembled stages to allow power and control currents to energize the electrical circuit. There is no structural connection between the interconnected stages and the terminal plate other than the electrical wiring connections to the terminals 38 and the input coaxial connectors 36, as the structural strength of the electrical connecting leads suffices to rigidly secure the plurality of stages together and to the terminal plate 35. Around the outside periphery of the terminal plate are provided threaded holes 39 for later insertion of screws to fasten support and housing members for enclosing the combined multistage circuit.

Figure 4:
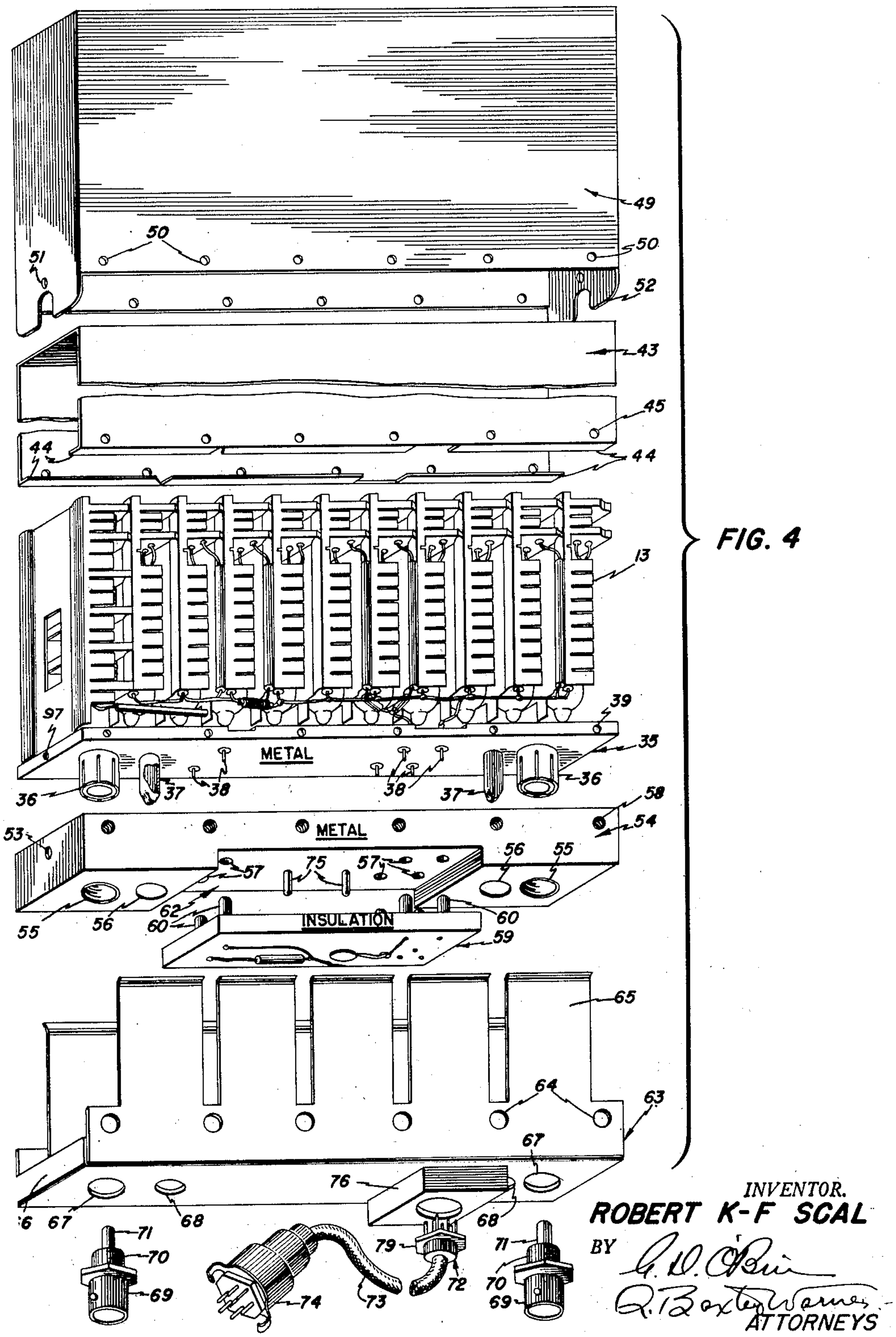
Fig. 4 is an exploded isometric view of the physical layout of the complete subminiature circuit and housing, showing top to bottom the case, case liner, assembled stages, socket holder, socket, socket cover, and miscellaneous electrical connections.

Fig. 4 is an exploded isometric view of the complete miniature assembly of electron tube stages of Fig. 3 and the preferred form of housing and socket members, and shows a case liner 43 for enclosing the multistage circuit to be fastened to the terminal plate, a structurally rigid case 49 for enclosing the case liner and tube circuit, and the completing socket holding member 54, socket 59, and socket cover 63 for electrically and structurally completing the overall unit.

The case liner 43 is preferably a thin open ended metallic surrounding cover for the miniature multistage assembly. The inturned lower edges 44 of this liner hook under the edges of the terminal plate 35 to prevent the liner from sliding upward when the case 49 is removed. Both sides of the case liner 43 have spaced holes 45 which overlie the threaded holes 39 on the terminal plate 35 when the liner encloses the multistage assembly and allow screw fasteners to secure the liner in place. The case liner protects the assembled stages from damage as the case 49 is removed, and also tightly fits over the plurality of stage chassis members allowing the cutout fingers 13 of the individual stage chassis sides to make contact with the sides of the liner. This contact assures a complete ground return circuit for all the individual stages, some of which might otherwise have no common ground connection. In an actual embodiment a silver case liner having a thickness of .004 inch was found to present satisfactory structural, electrical and thermal properties.

The case 49 may be in the form of a rectangular box having extensions 52 protruding from its ends. The case is adapted to slide over the multistage tube circuit after the protective case liner encloses the stages. Holes 50 are properly spaced along the case sides to overlie holes 45 and 39 of the case liner and terminal plate respectively when the liner and case members are positioned to enclose the miniature electron tube assembly and terminal plate. Two additional holes 51 at either end of the case are adapted to line up with tapped and threaded holes 97 of the terminal plate permitting screw fasteners to additionally fasten the case ends to the plate and provide a totally enclosed extremely rigid compact unit. If the miniature electron tube assembly is to be hermetically sealed all the screw fasteners may be eliminated, and a single soldering operation may connect the case liner and case to the terminal plate. Air within the sealed electron tube assembly may then be evacuated through one of the hollow exhaust tubes 37, and if desired a suitable gas or liquid filler may be inserted through the other of these exhaust tubes, after which the tubes are sealed. A case 49 made of 1/64 inch thick brass having a cadmium plating has been found to possess the structural characteristics required for satisfactory operation. Because the case liner provides electrical shielding and ground connection, a variety of case material and case finishes may be employed. Preferably the case and case finish should have a high structural strength, the ability to withstand high temperatures, and the ability to radiate appreciable amounts of heat.

The socket holding member 54, socket 59, socket cover 63, input and output jacks 69, and the control cable 73 complete the overall subminiature circuit and housing. The socket holding member 54 is the central connecting member for the overall housing serving to structurally, electrically, and thermally stabilize the operating circuit and housing members. Structurally, the socket holder presents a unitary, solid, rigid, member serving as a central connector for each of the interlocking housing members, and as a rugged receptacle holding terminal board enclosure for receiving the connectors extending from the terminal plate of the subminiature electron tube circuit. Electrically, the socket holder body surrounds each of the complementary connectors between the circuit terminal board, socket, and coaxial connector terminals, acting as an electrical shield for all outside connection to the circuit, and due to its contact with all of the housing members performs as a substantially equal potential ground connection. Thermally, this member due to its size, material, and proximity to the operating circuit, conducts heat away from the operating circuit, stores this heat, and distributes it to the case for radiation. This member 54 in the illustrative embodiment is preferably a metallic body having a square cross section and a top surface area coextensive with the area of the terminal plate of the tube assembly. Along the sides of this member are drilled and threaded holes 58 for receiving screws, and at either end holes 53 are similarly drilled and threaded. A rectangular volume is milled out of its central portion generally designated as 62 to receive a socket 59. Through the socket holder at opposite ends, and positioned with respect to the upper surface in the same arrangement as the positioning coaxial plugs 36 to the terminal plate are drilled holes 55. Press fitted into each of these openings from below are metallic inserts which are threaded to receive coaxial plugs 69 complementary to the coaxial plugs 36 fastened to the terminal plate. Offset holes 56 are drilled through the holder at either end and positioned to receive exhaust tubes 37, similarly offset in the terminal plate. Six further openings 57 are drilled through the socket holding member and positioned to confront pins 38 extending from the circuit terminal plate. In an actual embodiment of the preferred form of this device a dual socket having a ½ inch square cross section at the ends, and having silver plated inserts fitted into holes 55 was found to perform satisfactorily.

Socket 59 is formed of a nonconducting material and has a volume and side dimensions equal to that of the milled out portion of the socket holder. Six upright female pin connectors 60 surrounded by insulating material are embedded in the socket, and are positioned to allow their insertion into holes 57 of the holder when the socket is inserted within the space provided by the milled out portion. These female connectors extend entirely through the holes 57 to receive similarly positioned pins 38 extending outwardly from the terminal plate 35. Depending upon the connection through these members the insulation surrounding connectors 60 may be of ceramic material such as steatite where minimum stray capacity is desired, or of a high dielectric constant material where by-passing is desired. On the underside of the socket 59 electrical connections can be made by printed circuit techniques, and in certain cases subminiature elements such as coupling chokes, disc, capacitors, or resistors may be included in the wiring. The socket may be secured to the holder by a suitable soldered or clamped connection to the two studs 75 which project from the holder body.

The socket cover 63 is preferably an open ended spring metal box like member of phosphor bronze or other suitable material, adapted to tightly enclose the combined socket and socket holder, and frictionally engage the multistage circuit housing (case) sides, to complete the mechanical, electrical, and thermal, housing enclosure. Along the sides of the cover may be provided holes 64 positioned to overlie the threaded holes 58 of the socket when the cover encloses the socket and socket holder permitting the use of anchor screws to rigidly fasten the cover to the socket holder. The ends 66 of the socket cover are separated from the sides 65, and the sides and end members are preferably bent slightly inwardly, causing the sides 65 and the ends 66 of the socket cover to firmly grip the socket holder. A rectangular cable receiving projection 76 may be provided at the bottom of the socket cover to receive the end connector 72 of multiple connection cable 73 to provide electrical contact with the connections at the base of socket 59. The base of the socket cover at either end is drilled to allow coaxial connectors 69, which are complementary to the input and output coaxial connectors 36 extending from the terminal plate 35, to be inserted. These coaxial connectors when inserted through holes 67 of the socket cover and screwed into holes 55 of the socket holder provide a further mechanical fastening of the socket cover to the socket and socket holder combination. If desired further holes 68 may be drilled through the base of the socket cover and positioned to line up with holes 56 through either end of the socket holder to allow access to the exhaust tubes 37 extending from the miniature assembly terminal plate. The finger members 65 of the socket cover 63 are integral with, and extend along the sides of the cover to frictionally make contact with the case 49 and assure adequate grounding connection to the case. This completes the housing for the subminiature tube circuit, presenting a totally enclosed unit having all external electrical connections extending from connectors protruding from the socket cover.

To integrate the socket members, socket 59 is inserted in space 62 provided in the undersurface of holder 54, and female plugs 60 surrounded by ceramic insulators are press fitted into holes 57. Rigid connection may then be made by a soldering connection to studs 75 embedded in the socket holder or by any other suitable mechanical fastening device. Socket cover 63 is then slid over the combined socket holder and socket, and coaxial plugs 69 are inserted through openings 67 in the socket cover and threaded into receptacles 55 of the holder 54. Multiple connector 73 is then electrically fastened to contacts on socket 59 and further secured to the socket cover housing 76 by means of lock nuts 79 or other conventional means. Additional rigidity is then provided the assembly by screws inserted through holes 64 along the sides of the socket cover and threaded into similarly positioned openings 58 along the sides of the holder 54. This completes the socket housing presenting an electrical, thermal, and mechanical complementary receptacle for the electron tube subminiature enclosed unit.

Figure 5:
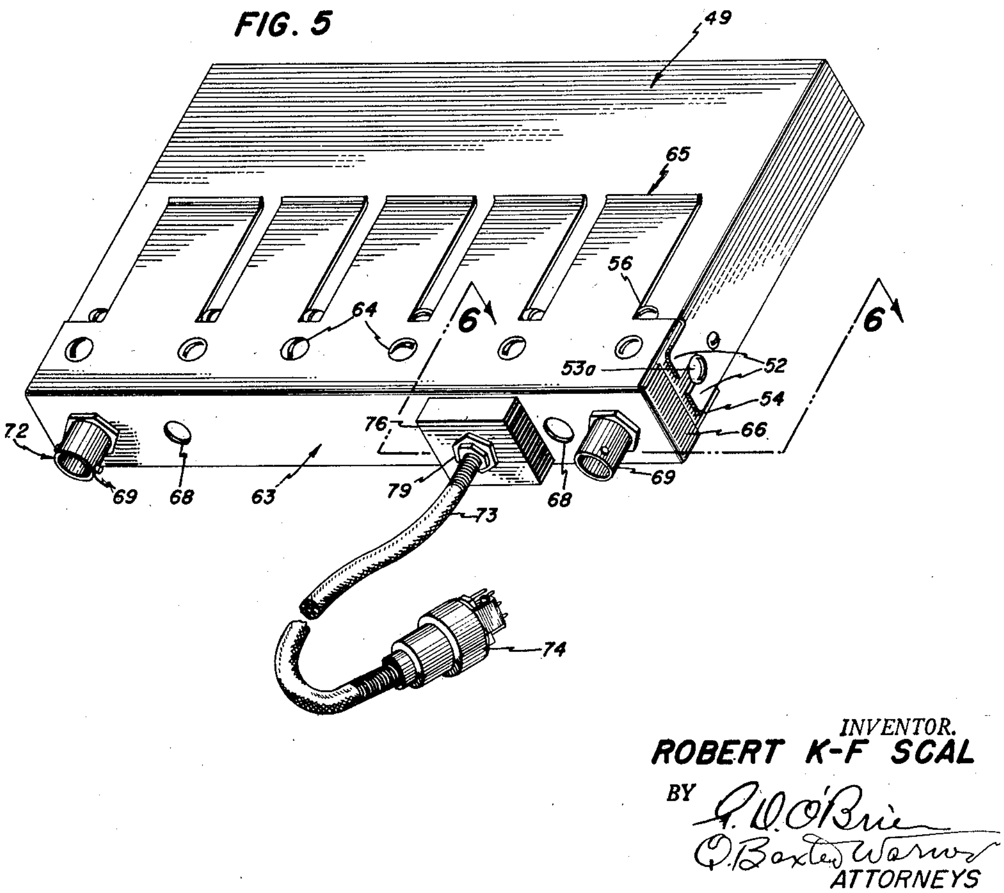
Fig. 5 is an exterior isometric view of an assembled housing.

The two units comprising the case enclosed multistage circuit and the socket and enclosure are combined by plugging the connectors extending from the terminal plate of the electron tube enclosed assembly into the complementary receptacles embedded in the socket unit, allowing coaxial connectors 36 to mate with similarly positioned coaxial connectors 69, pins 38 to mate with pins 60 and exhaust pins 37 of the terminal plate to further act as positioning pins and enter similarly positioned holes 56 of the holder, and 68 of the socket cover. The exhaust and positioning pins 37 may be slightly offset from the ends of the terminal plate, as may be the holder and socket cover openings 56 and 68 respectively allowing but a single orientation of the plugging connections. Although the upper case and the lower socket housed unit are frictionally held together by the mated connectors, a further connection may be made by fastening the slotted lower ends 52 of the case 49 to the ends of the holder 54 by means of anchor screws 53a threaded into holes 53 of the holder, as is more clearly seen in Fig. 5.

Figure 6:
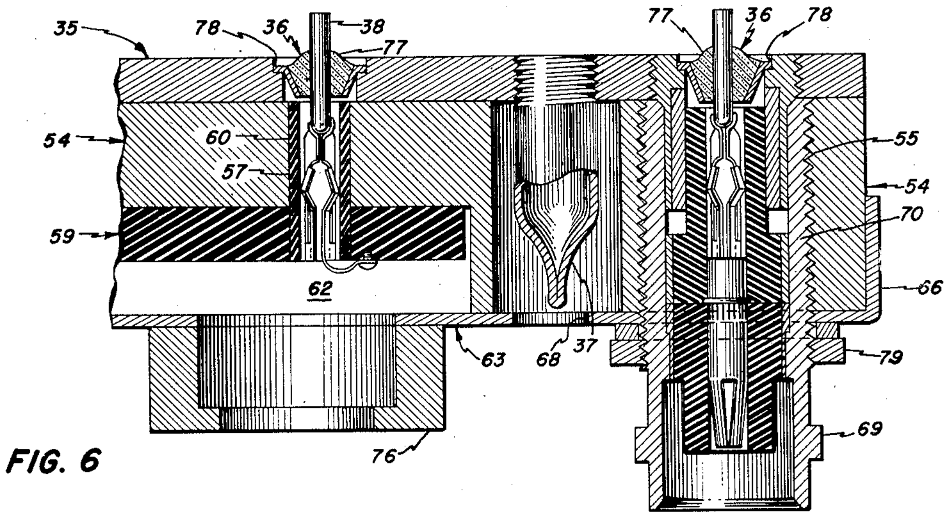
Fig. 6 is an enlarged cross-sectional view taken along a line substantially corresponding to line 6—6 of Fig. 5, showing the manner in which electrical connections are made through the socket holder.

Fig. 6 shows on an enlarged scale a longitudinal cross section of the mated connectors from the circuit terminal plate to the socket through the socket holder. Pins 38 and coaxial connectors 36 are shown embedded in glass Kovar insulators 77 extending through terminal plate 35. All of these insulators 77 may be soldered to the surrounding metallic members at points 78. The electrical connecting pins 38 are in contact with the female receptacles 60, extending from socket 59, and press fitted into openings 57 through the socket holder. The coaxial connectors 36 are in contact with the complementary coaxial connectors 69 extending through the socket cover 63, and having sides 70 threaded into socket holder 54 along opening 55. Socket 59 is inserted within the milled out portion 62 of holder 54, and positioned above the opening in the socket cover housing 76, for allowing multiple cable connector 73 (Fig. 5) to be inserted. Opening 56 in socket 54 (Fig. 4) and corresponding opening 68 in socket cover 63, are provided for positioning exhaust tubes 37 (Figs. 3 and 4), which extend down from terminal plate 35.

It may now be seen that what has been basically presented is a compact, completely enclosing metallic housing and metal to metal insulated terminal connection for a multistage electron tube circuit permitting ease of assembly and repair, and allowing the subminiature tube circuit to operate at high frequency with satisfactory power dissipation, by minimizing the electrical, thermal, and structural defects which arise due to miniaturization. This has been accomplished to a great extent by the function of the centrally disposed socket holding member which serves as a reference stabilizing device for the interlocking housing units. However, these specific structural elements and manner of assembly are merely shown as illustrative of a preferred embodiment of the invention and various changes may be made by those skilled in the art in accordance with the teaching herein, accordingly, this disclosure is intended to be limited only by the prior art and the scope of the appended claims.

The invention described herein may be manufactured and used by or for the Government of the United States of America for governmental purposes without the payment of any royalties thereon or therefor.

What is claimed is:

1. A socket assembly for enabling quick disconnect electrical connection to a plurality of spaced terminal connectors supported by and insulated from a metallic terminal board comprising: a non-conducting socket member supporting spaced complementary connectors, a solid metallic socket holding member having an upper surface coextensive with the spaced connectors and a thickness greater than the length of the connectors, a series of openings through the holding member coextensively positioned with the connectors, said holding member retaining the socket and adapted to be positioned intermediate the terminal board and socket whereby its surface provides metal-to-metal contact with the terminal board for electrical grounding and thermal conduction therefrom and its openings enable the engagement therein of the socket and terminal board connectors, each completely surrounded along its length by the metallic socket holder body.

2. An interlocking member housing assembly for hermetically sealing and electrically shielding a multitube electronic circuit and including a socket assembly for enabling quick electrical disconnect of the hermetically sealed circuit comprising: a metallic terminal board having hermetically embedded therethrough and insulated therefrom a plurality of terminals electrically connected to the circuit, an upper metallic cover cooperating with the terminal board to completely enclose and seal said circuit, a second electrical circuit within a lower metallic semi-enclosing member having a non-conducting terminal board provided with a plurality of terminal connectors complementary to the terminals of the first circuit, a metallic block having a thickness greater than the terminal lengths adapted to be positioned intermediate said two circuit terminal boards and enable mating of the terminals and terminal connectors therein, and means for removably fastening each of the metallic covers to the block providing rigid interconnection of the two circuits, electrical shielding of the terminals externally and from each other, and heat dissipation from the circuits to the block.

References Cited in the file of this patent

UNITED STATES PATENTS

| | | |
|---|---|---|
| 1,960,058 | Lynn | May 22, 1934 |
| 1,960,579 | Edwards | May 29, 1934 |
| 2,312,181 | Matthews | Feb. 23, 1943 |
| 2,439,408 | Mitchell | Apr. 13, 1948 |
| 2,439,412 | Mitchell | Apr. 13, 1948 |
| 2,446,701 | Greene | Aug. 10, 1948 |
| 2,499,589 | Kennedy | Mar. 7, 1950 |
| 2,651,833 | Kernahan | Sept. 15, 1953 |
| 2,668,933 | Shapiro | Feb. 9, 1954 |
| 2,682,018 | Phillips | June 22, 1954 |
| 2,737,579 | Wehrlin | Mar. 6, 1956 |